Feb. 28, 1950     G. NAHMAN     2,498,702
CYLINDRICAL MAGNETIC CORE
Filed Sept. 15, 1944
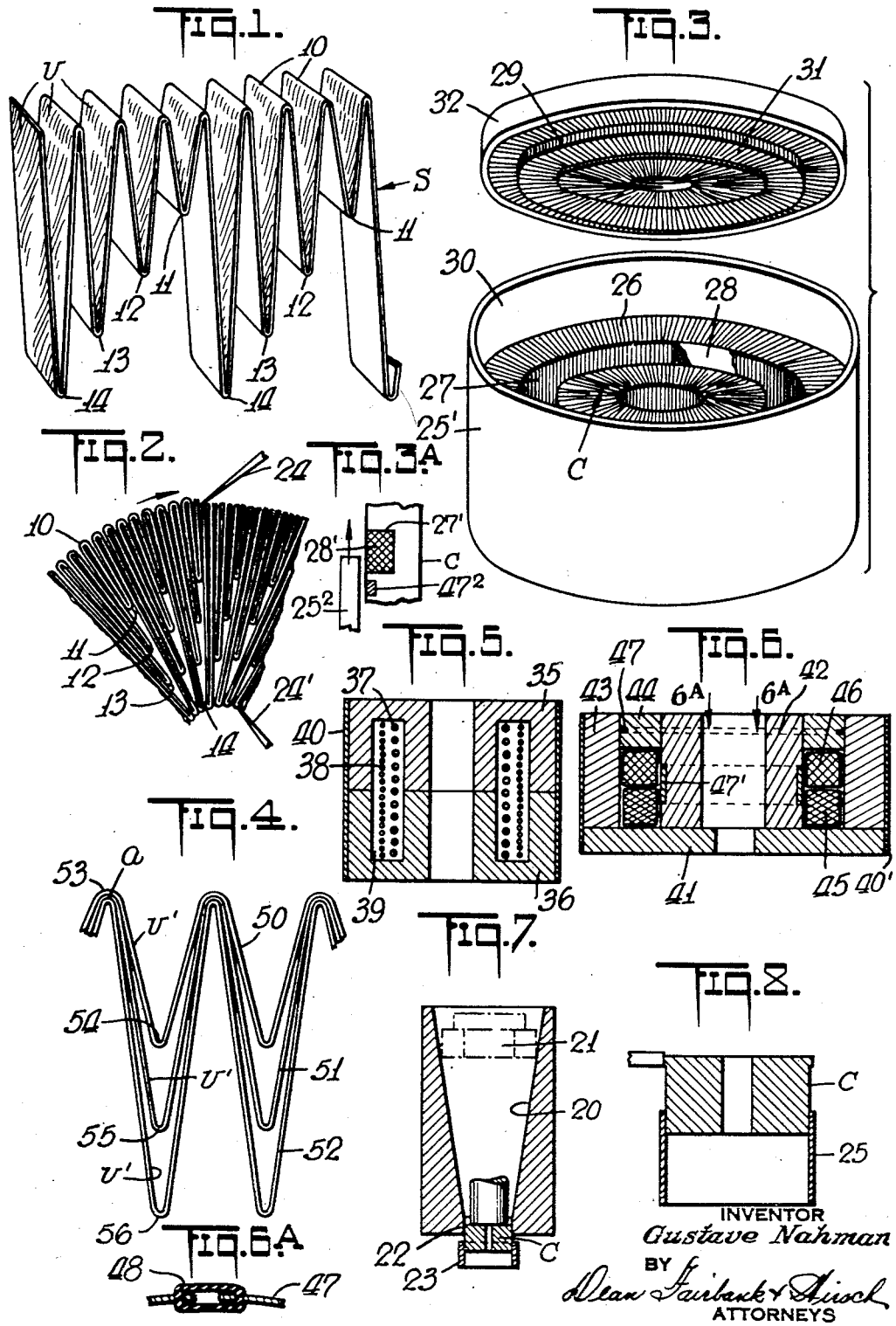
INVENTOR
*Gustave Nahman*
BY
*Dean Fairback & Hirsch*
ATTORNEYS Patented Feb. 28, 1950

2,498,702

UNITED STATES PATENT OFFICE 2,498,702

CYLINDRICAL MAGNETIC CORE

Gustave Nahman, Englewood, N. J.

Application September 15, 1944, Serial No. 554,291

2 Claims. (Cl. 175—356)

The present invention relates to electro-magnetic frames, fields, cores and the like of the type used in electric transformers, motors, relays, switches and other electro-magnetic devices.

While laminated cylindrical iron structures theoretically provide the most efficient magnetomotive circuits, their use has imposed obstacles due to the cost and difficulty of assembling the required multiplicity of such laminations radially of the cylinder, bearing in mind that progressively greater thickness of laminations is required from the core to the periphery. This difficulty of assembly accounts to considerable extent for the use by the art of rectangular magnetic structures, since the laminations may thus be easily assembled in superposed relation.

It is an object of the present invention to provide a simple, expeditious and inexpensive procedure for assembling laminations of uniform thickness in generally radial relation for producing a cylindrical magnetic structure that combines the advantages of such cylindrical form with the economy of assembly heretofore attained only by the use of rectangular structures.

Another object is to provide a magnetic core structure, the laminations of which are maintained assembled without the need for perforating or penetrating the individual laminations and with consequent enhanced efficiency of magnetomotive circuit.

In the accompanying drawings, in which are shown one or more of various possible embodiments of the several features of the invention:

Fig. 1 is a perspective view of a fragment of sheet metal strip from which the laminated structure is to be fabricated;

Fig. 2 is a fragmentary view of a core indicating a step in the fabrication thereof;

Fig. 3 is a dropped perspective view of an electromagnetic structure incorporating the invention;

Fig. 3A is a fragmentary sectional view of a modification;

Fig. 4 is a view in transverse cross section showing an alternative of the strip embodiment of Fig. 1;

Fig. 5 is a view in transverse cross section of a transformer embodying the invention;

Fig. 6 is a view similar to Fig. 5 of an alternative embodiment of transformer;

Fig. 6A is a fragmentary view taken on line 6a—6a of Fig. 6;

Fig. 7 is a diagrammatic cross sectional view showing assembly apparatus for compacting the strip into the cylindrical structure, and Fig. 8 is a diagrammatic view indicating the method of holding and machining the core assembly as shown in Fig. 2.

Referring now to the drawings, the method of fabrication of the cylindrical core structure as best shown in Figs. 1, 2, 7 and 8 will now be described. A single strip S of soft sheet iron, preferably less than .5 mm. in thickness, is folded transversely in zigzag fashion. The strip is covered by suitable insulating varnish $v$ on one face only as shown, to avoid direct contact between successive laminations in accordance with familiar practice. Alternate folds 10 extend in a common plane as shown in Fig. 1. The intervening folds are arranged in recurring small groups, in the illustrative embodiment shown in groups of four, i. e. folds 11, 12, 13 and 14, at progressively greater distance from the common plane of folds 10. The distance between the set of folds 14 most remote from the plane of folds 10 defines the radial length of the cylindrical structure to be formed. A length of strip is used such that the combined thickness of the multiplicity of plies is equal to the periphery of the structure to be formed.

The folded strip is now compacted into a cylinder. This may be readily accomplished by introducing it into an assembling fixture (Fig. 7) having a frustoconical inner well 20, largest at its top. To this end the zigzag folded strip of Fig. 1 is preferably loosely bent accordion fashion about a mandrel or form 21, with the folds 10 outermost, so that they define a large diameter cylinder. The form 21 with the encircling zigzag strip is introduced into the frustoconical well 20. As it is pressed downward into said well, the form 21 is removed and the folds of the zigzag strip are gradually and uniformly pressed together as the folded wreath of strip is pressed downward, until when the cylindrical bottom 22 of the fixture is reached, the folded strip has been conformed into the compact cylinder shown in Fig. 2.

Desirably a cylindrical shell 23 snugly grips the periphery of the compacted cylinder at one end as the latter is pushed out of the assembling fixture. The cylindrical shell 23 may form the case or holder, for the compacted wreath or strip thus formed. Where the magnetic core is to be used in relations in which the magnetic flux may pass across the periphery, the peripheral folds must be removed so that the laminations at the outer periphery are separated and distinct. To this end shell 23 may be used as a chuck to be mounted in a lathe (not shown) where the compacted strip is now machined, as suggested at 24 in Fig. 2, to cut off the folds 10, and thereby to sever the strip into a multiplicity of individual sets of plied laminations. Likewise where the magnetic flux is to pass inward beyond the inner periphery of the structure, the folds 14 should be similarly machined away as suggested at 24' in Fig. 2.

As suggested in Fig. 8, a shell 25 desirably of iron or steel, is now snugly telescoped over the machined portion of the laminated cylinder C and used as the chuck in machining off that portion of the surface that had been retained by chuck 23, whereupon the compacted laminated cylinder structure is forced home into said encompassing shell 25.

In one embodiment of the invention, the laminated cylindrical core C thus held in shell 25', as best shown in Fig. 3, may be machined in a lathe to smooth its face 26. It may likewise be so machined to cut thereinto the annular well 27, in which the current carrying electromagnetic coil, a fragment of which is shown at 28 may be accommodated.

Alternatively, as shown in Fig. 3A and as is useful particularly for solenoids, a groove 27' may be fashioned about or peripherally of the core, (instead of the well 27 in the face of the core) and the coil 28' is accommodated therein, a cylindrical armature $25^2$ encompassing the structure.

The specific embodiment of Fig. 3, which shows a form of electromagnet, preferably includes a cylindrical disk armature 29 to fit sufficiently loosely within the rim 30 of the shell 25'. The armature may be, and preferably is, fabricated on the same principle as the main body, but, of course, from a correspondingly narrower strip, its radiating laminations being suggested at 31. As suggested in Fig. 3, the face of the armature may be machined after assembly into its shell or rim 32 to any desired conformation, stepped or plane or conical.

As best seen in Fig. 2, for the small sector of the cylinder that is defined by each recurring group of laminations, there are two laminations near fold 14, four laminations near fold 13, six laminations near fold 12, and eight laminations from fold 11 to the periphery. But, since the varnish covering $v$ is on only one face of the strip, the direct iron to iron path for magnetic flux radially of the core is not interrupted by such varnish coating. There is, as has been shown, a progressively greater number of laminations of uniform thickness per unit of sector from the axis to the periphery, for uniformly filling the progressively lengthening arcs of each sector. Of course, depending upon the degree of refinement desired and the thickness of lamination used, a greater or lesser number of steps may be employed.

In the embodiment of Fig. 5 there is shown a form of transformer made up of a pair of units 35 and 36 on the same principle as the unit C in Fig. 3 above described. The transformer primary coil 37 and secondary coil 38 are confined in the cylindrical cavity 39 thus formed between the two units 35 and 36, and said units are preferably encased in a shell 40 snugly thereabout.

In the embodiment of Fig. 6 is shown a much larger transformer in which the field or magnetic frame structure is illustratively made up of four distinct parts, including a foundation or base disk 41, a pair of concentric cylinders 42 and 43 rising therefrom and a fourth bridging member 44 of annular form which intervenes between the two cylindrical structures 42 and 43 and confines the transformer coils 45 and 46 that rest upon the base disk 41 and extend between the two cylinders 42 and 43.

Each of the constituent elements, i. e., the foundation disk 41, the cylinders 42 and 43, and the bridging annulus 44 is preferably fabricated on the principle heretofore described and shown in Figs. 1, 2, 7 and 8, and each of said elements is rigidly held together in an enclosing ring.

To effect an intimate direct contact or engagement between the lamination ends at the inner periphery of cylindrical structure 43 and those at the outer ends of the laminations of structure 44, the inner periphery of cylinder 43 may be machined, as suggested at 24' in Fig. 2, thereby to eliminate the fold 14 and to afford a low-loss path for magnetic flux between elements 43 and 44. Similarly, the folds at the inner periphery of annulus 44 may be eliminated for the like low-loss path between elements 42 and 44. But the outer periphery of outer cylinder 43 may be a full width shell as at 40'.

To permit the direct engagement of the lamination ends of neighboring elements 42, 43, 44, the encompassing holder, belt or ring of each inner member 42 and 44 should be much thinner than the thickness or height of the member it encompasses. The member 47 about annulus 44 is shown as a narrow belt, lodged in a peripheral groove in said annulus. The corresponding member about cylinder 42 is a belt 47' below annulus 44. Similarly, narrow belt $47^2$ encompasses and holds together core C of Fig. 3A.

The shells or belts 47, 47' between two concentrically contacting cylindrical core surfaces, of iron or other metal must not form a closed circuit, otherwise current will be induced therein. It is, therefore, preferred to provide, as shown in Fig. 6A, an open belt, the spaced ends of which are connected together by a strip 48 of insulating material.

It will be understood that the general embodiment of Fig. 6 could be constructed as a solenoid, usually on a relatively small scale, the outer shell 43 being loosely mounted and moving as a cylindrical armature and alternatively the inner cylinder 42 could be movable as the armature.

In Fig. 4 is shown an alternative embodiment of sheet metal strip arrangement for producing the laminated structure. In this embodiment instead of using a single soft iron strip as in Fig. 1, a plurality of strips, desirably two, three, four or more of such strips, all of uniform width, are used. These strips, illustratively three in number 50, 51, and 52 are transversely folded in zigzag relation, the folds of each strip being uniformly spaced but the folds of no two strips having equal spacing. As in the embodiment of Fig. 1, only one face, desirably the convex face of each lamination is coated with insulating varnish as at $v'$. In the process of folding the strips, this coating $v'$ is ground off to leave the apex clean and uncoated as at $a$ on the inner strips 51 and 52 so that an uninterrupted magnetic circuit exists at that region between the various strips. The zigzag strips are nested, i. e. alternate folds are superposed at 53 in a common plane and the intervening folds 54, 55 and 56 are in nested but spaced relation. The compacted cylindrical structure is formed from the strips shown in Fig. 4 and just described, in exactly the same manner as the structure of Fig. 1 and with substantially the same advantages. Where the magnetic flux is to pass peripherally outward, as from annulus 44 in Fig. 6, the cylindrical structure may be machined in exactly the manner shown in Fig. 2 at its outer periphery to remove the folds of the superposed laminations at the outer periphery of the laminated structure. For making a laminated cylindrical core of any type, including those specific embodiments shown and described, the strip embodiments of Figs. 1 and 4 may be used interchangeably, or both types may be used in different core elements such as in the structure of Fig. 6.

In the preferred embodiments, of which Figs. 3, 5 and 6 are illustrative, the laminated magnetic structure completely confines the current carrying coil structure. In other words, the coil encompasses part of the magnetic structure, is encompassed by another part thereof and is confined at its ends by further parts of such structure. This is to be sharply contrasted with conventional arrangements in which magnetic leakage is possible, because some part of the coil structure is exposed and spaced from the magnetic structure. In the present case the magnetic flux must necessarily all pass through the laminated magnetic structure with corresponding high efficiency. Moreover, the laminated magnetic structure so effectively takes the flux that the external confining shell 25, 25', 40 or 40', may be and preferably is a closed ring or collar of iron, steel or other magnetic material and yet no part of the magnetic flux will be diverted therethrough.

In both the embodiment of Fig. 1 and that of Fig. 4 there is thus no need for individually assembling the multiplicity of laminations, for the zigzag folding of the unitary strip entity in any suitable folding machine, and the bending into form and if required, the subsequent machining away of the outer folds brings about the desired assembly of the multiplicity of individual lamination sets, in which, moreover, the number of uniform laminations per unit of sector angle progressively increases from axis to periphery.

In each embodiment, the laminations are snugly confined in an archlike relation, and though held only frictionally the compacted laminated structure is so very rigid and secure that it even admits of machining when held in a chuck or in its shell as above described, and such machining is performed with the same facility as if the laminated structure were an integral block. The need for the rivets commonly used for holding assembled the laminations of a magnetic core, the cost of applying the same and the impairment in the magneto-motive circuit incurred by the use of such rivets, all are avoided by the present invention.

While the structure 25, 25' and 40 has been designated in each case as a shell, it will be understood that it is not necessary that such enclosure extend the entire axial length of the magnetic body which it engages, but a narrower enclosure ring, indeed one as narrow as belt 47 might be useful generally. The term belt as used in certain of the claims is, therefore, intended to be generic to shells 25, 25' or 40, whether of width equal to the full axial height of the core or of only a fraction of such width, such as the belt 47.

Manifestly, it would be possible within the scope of the broadest claims to utilize only part of the advantages attained by the invention insofar as ease of assembly is concerned. For instance, the recurrent groups of laminations could if desired be formed as separate units and individually assembled in the shell.

It will also be understood that in the case of a magnetic shell structure of small width as for instance that of bridging piece 44, it might be sufficient to use a single uniformly bent zigzag strip such as a zigzag strip of Fig. 4 without the need for graduating the number of plies from the inner to the outer periphery.

As many changes could be made in the above structure and method and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A generally cylindrical magnetic structure, comprising laminations of uniform thickness extending generally radially, said laminations being generally arranged in a progressively greater number per unit of sector from the axis to the periphery of the structure for nearly uniform compactness of the laminations throughout the structure, certain of said laminations extending in pairs of folded plies, said structure having a current coil carrying groove coaxial therewith, a current carrying coil in said groove, and an armature adjacent the otherwise exposed face of said coil.

2. A generally cylindrical magnetic structure, comprising laminations of uniform thickness extending generally radially, said laminations being arranged in a progressively greater number per unit of sector from the axis to the periphery of the structure for nearly uniform compactness of the laminations throughout the structure, certain of said laminations extending in pairs of folded plies, said structure having a peripheral groove therein, a current carrying coil lodged in said groove and a hollow armature core adjacent the otherwise exposed side of said coil.

GUSTAVE NAHMAN.

REFERENCES CITED

The following references are of record in the file of this patent:

UNITED STATES PATENTS

| Number | Name | Date |
| --- | --- | --- |
| 432,050 | Kammeyer | July 15, 1890 |
| 952,105 | Fish | Mar. 15, 1910 |
| 1,543,001 | Gaynor | June 23, 1925 |
| 1,644,729 | Johannesen | Oct. 11, 1927 |
| 1,750,149 | Zamboni | Mar. 11, 1930 |
| 2,107,973 | Bajon | Feb. 8, 1938 |
| 2,246,239 | Brand | June 17, 1941 |
| 2,314,912 | Troy | Mar. 30, 1943 |
| 2,324,115 | Schultz | July 13, 1943 |
| 2,372,529 | Somes | Mar. 27, 1945 |
| 2,411,374 | Horstman | Nov. 19, 1946 |

FOREIGN PATENTS

| Number | Country | Date |
| --- | --- | --- |
| 267,619 | Great Britain | Mar. 21, 1927 |
| 460,275 | Germany | May 25, 1928 |
| 482,771 | Great Britain | Apr. 5, 1938 |
| 504,328 | France | June 30, 1920 |